US009363787B2

(12) United States Patent
Mun et al.

(10) Patent No.: US 9,363,787 B2
(45) Date of Patent: Jun. 7, 2016

(54) METHOD FOR RECEIVING AND PROVIDING MULTICAST BROADCASTING SERVICE

(75) Inventors: Du Hyun Mun, Anyang-Si (KR); Yong Ho Kim, Anyang-Si (KR); Ki Seon Ryu, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 461 days.

(21) Appl. No.: 12/601,238

(22) PCT Filed: May 19, 2008

(86) PCT No.: PCT/KR2008/002789
§ 371 (c)(1),
(2), (4) Date: Nov. 20, 2009

(87) PCT Pub. No.: WO2008/143448
PCT Pub. Date: Nov. 27, 2008

(65) Prior Publication Data
US 2010/0165908 A1    Jul. 1, 2010

(30) Foreign Application Priority Data

May 22, 2007    (KR) .......................... 10-2007-0049838

(51) Int. Cl.
| *H04H 20/71* | (2008.01) |
| *H04W 72/00* | (2009.01) |
| *H04W 48/08* | (2009.01) |
| *H04W 48/16* | (2009.01) |

(52) U.S. Cl.
CPC ............ *H04W 72/005* (2013.01); *H04W 48/08* (2013.01); *H04W 48/16* (2013.01)

(58) Field of Classification Search
USPC ................... 370/312, 329, 390, 432; 455/403
See application file for complete search history.

(56) References Cited

U.S. PATENT DOCUMENTS

| 7,869,401 | B2 * | 1/2011 | Dang et al. ..................... 370/329 |
| 2006/0239265 | A1 * | 10/2006 | Son et al. ....................... 370/390 |
| 2007/0064669 | A1 * | 3/2007 | Classon et al. ................ 370/347 |
| 2007/0072604 | A1 | 3/2007 | Wang |
| 2008/0147862 | A1 * | 6/2008 | Chatani et al. ................ 709/225 |
| 2008/0152003 | A1 * | 6/2008 | Oguz ........................ 375/240.12 |
| 2009/0178095 | A1 * | 7/2009 | Zuo ................................ 725/109 |
| 2012/0011413 | A1 * | 1/2012 | Liu et al. ........................ 714/746 |

FOREIGN PATENT DOCUMENTS

| CA | 2 586 060 A1 | 5/2006 |
| KR | 10-2002-0044169 A | 6/2002 |
| WO | WO-2006/085732 A1 | 8/2006 |

* cited by examiner

*Primary Examiner* — Donald Mills
*Assistant Examiner* — Henry Baron
(74) *Attorney, Agent, or Firm* — Birch, Stewart, Kolasch & Birch, LLP (57) ABSTRACT

A method for adaptively receiving and providing a multicast broadcasting service (MBS) according to at least one of capability and a channel status of a mobile station (MS) is disclosed. In more detail, a base station provides the MBS to MSs using different layers according to the capabilities and/or the channel statuses of the MSs, and the MSs adaptively receive the MBS according to the respective capabilities and/or the channel statuses of the MSs.

9 Claims, 5 Drawing Sheets

METHOD FOR RECEIVING AND PROVIDING MULTICAST BROADCASTING SERVICE

TECHNICAL FIELD

The present invention relates to a method for adaptively receiving and providing a multicast broadcasting service (MBS) according to capability and/or a channel status of a mobile station (MS).

BACKGROUND ART

In a broadband wireless access system, data transmission between a base station and a MS is made via a "service flow". The service flow includes a service flow identifier (SF ID) for identifying the service flow between the base station and the MS, a connection identifier (CID) for identifying a connection for delivering service flow traffic, and quality of service (QoS) parameters for service quality and security information for ensuring the security of the service flow.

In general, the service flow establishes one-to-one connection between the base station and the MS, but the MBS is a point-to-multipoint service for transmitting data from one source to a plurality of receivers. Thus, the base station transmits the same data to several MSs via one service flow. That is, when the MBS flow between the base station and the MS is generated, the base station applies the same CID to several MSs for requesting the reception of the MBS data such that the several MSs can simultaneously receive the same MBS data. A coverage which can provide a service by applying one CID to the several MSs is called an MBS zone.

The MBS zone includes several base stations and the several base stations in one MBS zone can provide the same service via one service CID in several cells. Due to such characteristics, the MBS generally transmits common data from one source to a plurality of receivers via a plurality of base stations. In this case, although a supportable user throughput varies according to the capabilities of user equipments and channel statuses between the user equipments and the base station even in a multicast group which receives the same service, a service suitable for a user equipment for supporting a lower throughput should be provided in order to allow all users to receive the MBS data. Therefore, a user equipment having a channel status or capability which can receive a superior service cannot receive the superior service due to other MSs which have inferior statuses in the same group.

DISCLOSURE

Technical Problem

An object of the present invention devised to solve the problem lies on a method for providing a multicast broadcasting service (MBS) with differential quality according to capabilities of MSs and channel statuses between the MSs and a base station to the MSs included in a multicast group in a broadband wireless access system and a method for adaptively receiving the MBS at the MSs.

Technical Solution

The object of the present invention can be achieved by providing a method for receiving a multicast broadcasting service (MBS), the method including: reporting status information about at least one of capability and a channel status of a mobile station to a base station; receiving information about an available service layer level according to the status information among all available service layer levels for providing the MBS from the base station; and adaptively receiving the MBS, which is provided by the base station via at least one available service layer according to the available service layer level, in accordance with at least one of the capability and the channel status of the mobile station.

In another aspect of the present invention, provided herein is a method for receiving a multicast broadcasting service (MBS), the method including: receiving information about all available service layer levels for providing the MBS; transmitting status information about at least one of capability and a channel status of a mobile station and information about an available service layer level according to the status information among all the available service layer levels; and adaptively receiving the MBS, which is provided by the base station via at least one available service layer according to the available service layer level, in accordance with at least one of the capability and the channel status of the mobile station.

At this time, the available service layer may be decided by at least one layer including a base layer according to the status information, among the base layer and at least one enhanced layer, and the base layer may include minimum information necessary for receiving the MBS. The base layer may use a modulation rate and/or a coding rate less than a predetermined threshold and the at least one enhanced layer may use a modulation rate and/or a coding rate equal to or greater than the predetermined threshold.

The information about the available service layer level may include at least one of a service flow ID representing the MBS, at least one multicast connection ID (CID) which is mapped to the service flow ID and corresponds to the at least one available service layer, and quality of service (QoS) information of the at least one multicast CID. Alternately, the information about the available service layer level may include at least one of at least one service flow ID corresponding to the at least available service layer, at least one multicast connection ID (CID) which is mapped to the at least one service flow ID, and quality of service (QoS) information of the at least one multicast CID.

The reporting of the status information and the receiving of the information about the available service layer level may be performed in a connection establishing step for entrance into the MBS. The method may further include, before the connection establishing step, transmitting information for the reception of the MBS of the mobile station, and receiving the information about all the available service layer levels for providing the MBS.

The adaptively receiving of the MBS may include receiving the MBS provided via the base layer and selectively receiving the MBS provided via the at least one enhanced layer according to at least one of the capability and the channel status of the mobile station if the MBS is provided via the at least one enhanced layer.

In a further aspect of the present invention, provided herein is a method for providing a multicast broadcasting service (MBS), the method including: receiving status information about at least one of capability and a channel status of at least one mobile station from the at least one mobile station; transmitting information about available service layer level according to the status information of the at least one mobile station among all available service layer levels for providing the MBS; and providing the MBS via at least one available service layer according to the available service layer level of the at least one mobile station.

In a further aspect of the present invention, provided herein is a method for providing a multicast broadcasting service (MBS), the method including: transmitting information about all available service layer levels for providing the MBS to at least one mobile station; receiving status information about at least one of capability and a channel status of at least one mobile station and information about an available service layer level according to the status information of the mobile station among all the available service layer levels from the at least one mobile station; and providing the MBS via at least one available service layer according to the available service layer level of the at least one mobile station.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details. For example, in the following description, messages and parameters include details such as a structure for achieving the object of the present invention and a type and a length which can be readily implemented by those skilled in the art, but the detailed configuration including the structure for obtaining the effect of the present invention may be modified and used.

In some instances, well-known structures and devices are omitted in order to avoid obscuring the concepts of the present invention and the important functions of the structures and devices are shown in block diagram form. The same reference numbers will be used throughout the drawings to refer to the same or like parts.

As described above, the present invention relates to a method for providing a multicast broadcasting service (MBS) with differential quality according to capabilities of MSs and channel statuses between the MSs and a base station to the MSs included in a multicast group in a broadband wireless access system and a method for adaptively receiving the MBS at the MSs. First, an entrance method for allowing an MS to receive an MBS will be described. At this time, a method for providing and receiving the MBS with differential quality according to the capabilities of MSs in accordance with embodiments of the present invention will be described.

Figure 1:
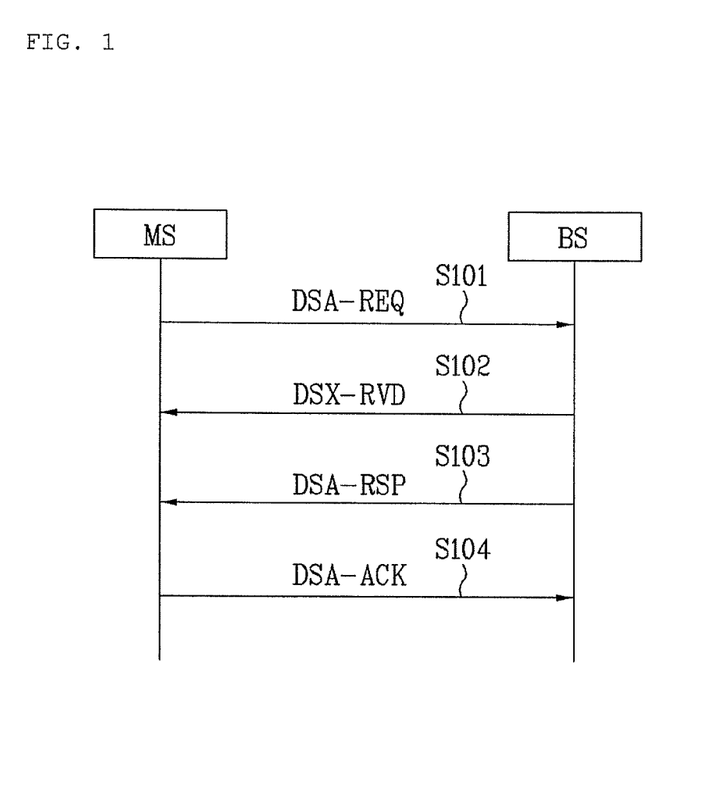
FIG. 1 is a flowchart illustrating a dynamic service addition (DSA) message which is initiated by an MS, for entrance of the MS into a multicast broadcasting service (MBS).

FIG. 1 is a flowchart illustrating a dynamic service addition (DSA) message which is initiated by an MS, for entrance of the MS into an MBS.

In order to receive an MBS in a broadband wireless access system, the MS makes a request for the MBS via a DSA-REQ message to a base station in a step S101, for establishing a session. The DSA-REQ message transmitted at that time is as follows.

TABLE 1

| Syntax | Size | Notes |
|---|---|---|
| DSA-REQ_Message_Format( ){ | | |
|     Management Message Type = 11 | 8 bits | |
|     Transaction ID | 16 bits | |
|     TLV Encoded Information | variable | TLV specific |
| } | | |

Then, the base station sends a DSX-RVD message in a step S102 so as to inform the MS that the base station processes the DSA-REQ of the MS and causes the MS to be in a waiting state. The format of the DSX-RVD message transmitted at that time may have a form in which a type-length-value (TLV) field is removed from the following DSA-RSP message. Thereafter, the base station which completes the process of the DSA-REQ allocates a multicast CID and a parameter for the MBS to the MS via a DSA-RSP message in a step S103. The DSA-RSP message transmitted at that time is as follows.

TABLE 2

| Syntax | Size | Notes |
|---|---|---|
| DSA-RSP_Message_format( ){ | | |
|     Management Message Type = 12 | 8 bits | |
|     Transaction ID | 16 bits | |
|     Confirmation Code | 8 bits | |
|     TLV Encoded Information | variable | TLV specific |
| } | | |

The MS which receives the DSA-RSP responds to the base station via a DSA-ACK message in a step S104. The DSA-ACK message transmitted at that time is as follows.

TABLE 3

| Syntax | Size | Notes |
|---|---|---|
| DSA-ACK_Message_Format( ){ | | |
|     Management Message Type = 13 | 8 bits | |
|     Transaction ID | 16 bits | |
|     Confirmation Code | 8 bits | |
|     TLV Encoded Information | variable | TLV specific |
| } | | |

A service flow ID, a CID and a QoS parameter are set with respect to an MBS using a TLV value of an MAC message via the exchange of the DSA message between the MS and the base station and the service is then provided. Accordingly, if this service is used, it is impossible to adaptively provide the service.

Accordingly, in one embodiment of the present invention, a method for adaptively providing and receiving the MBS according to the capabilities and/or the channel statuses of the MSs using a scalable video coding (SVC) method in a process of providing and receiving the MBS is provided.

In the SVC method used in the embodiment of the present invention, a base layer and at least one enhanced layer may exist in order to provide the same service. At this time, the MS can receive a desired service even when only the base layer is received, but the quality of the service may be low (for example, when only the base layer is received, resolution may be low in image communication or supplementary information related to the MBS and supplementary information for a more accurate service may not be received). However, when the MS receives the base layer and at least one enhanced layer, the quality of the service can be improved as the number of enhanced layers is increased. At this time, the base layer is encoded/decoded by H.264 and the enhanced layer can be encoded/decoded using a SVC tool.

The concept of the method for providing and receiving the differential MBS according to the capabilities and/or the channel statuses of the MSs using the above-described method will now be described in detail.

Figure 2:
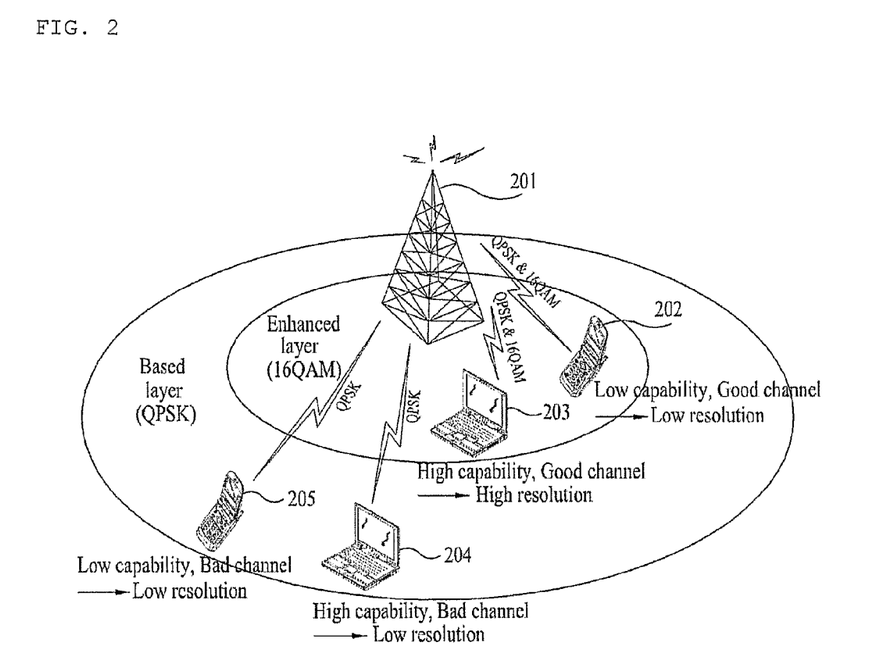
FIG. 2 is a view showing the concept of a method for providing and receiving a differential MBS according to the capabilities and channel statuses of MSs, in accordance with an embodiment of the present invention.

FIG. 2 is a view showing the concept of a method for providing and receiving a differential MBS according to the capabilities and channel statuses of MSs, in accordance with an embodiment of the present invention.

According to the embodiment of the present invention shown in FIG. 2, a method for selectively using one or a plurality of connections for one service is used. For example, for one streaming service, one piece of streaming data is transmitted in a state of being divided into the base layer and several enhanced layers according to the capabilities and the channel statuses of the MSs, like the case of using the SVC method. Although the MS receives only the base layer, a desired service can be received. However, when the base layer and the enhanced layers are received, the streaming service having higher quality can be received. If this method is used, it is possible to provide differential services to the MSs in a multicast group according to the capabilities and/or the channel statuses of the MSs.

First, in order to receive the MBS service, the MS negotiates the service layer level, which can be supported by the MS, via the exchange of the DSA message. Then, the base station provides the MBS using a low modulation scheme and a robust channel coding scheme (for example, QPSK 1/2) in the base layer and provides the MBS using a high modulation scheme and a weak channel coding scheme (for example, 16QAM 2/3 or 64QAM 3/4). That is, the service is provided by changing the modulation scheme and/or the coding scheme according to the level of the layer, and an MS having a good channel status receives the enhanced layer for providing a higher modulation and/or higher channel coding rate than the base layer. Thus, it is possible to receive the service with higher quality.

In more detail, in FIG. 2, the base station 201 provides the MBS to MSs 202 and 203, which are close to a base station 201 and have a good channel status, using both the base layer using the QPSK and the enhanced layer using the 16QAM as the modulation scheme and provides the MBS to MSs 204 and 205, which are far from the base station 201 and have a bad channel status, using only the base layer using the QPSK.

At this time, even in the MS which receives the MBS using the base layer and the enhanced layer, if the capability of the MS is bad (for example, the MS 202 of FIG. 2), the MBS is not received using both the base layer and the enhanced layer, that is, the MBS is received using only the base layer. That is, the MBS which is differentially provided according to the channel statuses of the MSs can be adaptively received according to the capabilities of the MSs and thus the qualities of the MBSs which are received by the MSs can be decided (for example, FIG. 2 shows the decision of the resolution of an image service as the quality of the MBS).

Meanwhile, in the MSs 204 and 205 which receive the MBS using only the base layer, the MBS is received using only the base layer although the capability of the MS is good. Accordingly, the MBS having low quality is provided.

In the example shown in FIG. 2, a method for, at the base station, selecting a layer for differentially providing the MBS in consideration of the channel statuses of the MSs and providing the MBS and, at the MSs, adaptively receiving the MBS according to the capabilities of the MSs is described. In contrast, in the method for providing and receiving the MBS according to one embodiment of the present invention, a method for differentially selecting a layer according to the capabilities of the MSs, providing the MBS and adaptively receiving the MBS according to the channel statuses of the MSs may be used. The embodiment of the present invention is not limited to the method for providing and receiving the differential MBS in consideration of the capabilities and/or the channel statuses of the MSs.

In summary, according to one embodiment of the present invention, a method for deciding the level of the layer for providing the MBS using at least one of the capability and the channel status of the MS when the MS enters into the MBS of the base station, for example, when the DSA is established as shown in FIG. 1 and, at the base station, changing the modulation scheme and/or the coding rate according to the layers such that the MS dynamically receives the adaptive layer level according to the channel statuses of the MSs is provided such that the differential service can be provided by a method using two elements in one multicast group according to the capabilities and the channel statuses of the MSs.

Hereinafter, a detailed method for implementing one embodiment of the present invention will be described.

In order to use the method according to the present embodiment, it is preferable that the base station informs the MS that two streams are associated with one service when the streams coded by the base layer and the enhanced layer are transmitted to the MS. In one embodiment of the present invention, at least two multicast CIDs mapped to one multicast service flow ID and the respective Qos levels of the multicast CIDs are defined. In another embodiment of the present invention, service flow IDs are defined according to the layers used for providing the MBS and a plurality of CIDs mapped to the plurality of service flow IDs and the respective Qos levels of the plurality of CIDs may be defined.

In the above-described embodiment, in order to decide the level of the enhanced layer according to the capabilities and/or the channel statuses of the MSs, it is preferable that a method for using the capabilities and/or the channel statuses of the MS when the DSA messages are exchanged is defined.

The embodiment related to the definition of the parameters for providing the MBS and the embodiment related to the method for using the capabilities and/or the channel statuses of the MSs when the DSA messages are exchanged will now be described in more detail by the comparison with the existing method.

In the general broadband wireless access system shown in FIG. 1, the MBS was provided to the MS by mapping one multicast CID to one SFID according to the multicast service via the exchange of the DSA_REQ, DSA_RSP and DSA_ACK messages. If the SVC according to one embodiment of the present invention is applied using the general method, that is, if one stream is transmitted to the MS in a state of being divided into at least two layers, it is disadvantageous that the DSA messages should be exchanged by the number of layered streaming data, that is, the number of multicast connections, because the MBS should be transmitted via the multicast connection.

In one embodiment of the present invention, if the SVC is used in a state in which such disadvantage is solved, that is, if data of several layers should be transmitted for one service, a method for defining one service flow ID, several multicast CIDs and respective QoS types of the CIDs or defining a plurality of service flow IDs of layers, CIDs mapped to the service flow IDs and respective QoS types of the CIDs by performing a process of establishing the connection once is provided such that it is possible to reduce message overhead due to repeated exchange of the DSA messages.

When the DSA message is exchanged in order to establish an MBS session, a method for applying the capabilities and/or the channel statuses of the MSs is defined and, when the base station transmits MBS data traffic to the MS, a method for informing the MS of whether the traffic corresponds to the base layer or the enhanced layer is defined.

Figure 3:
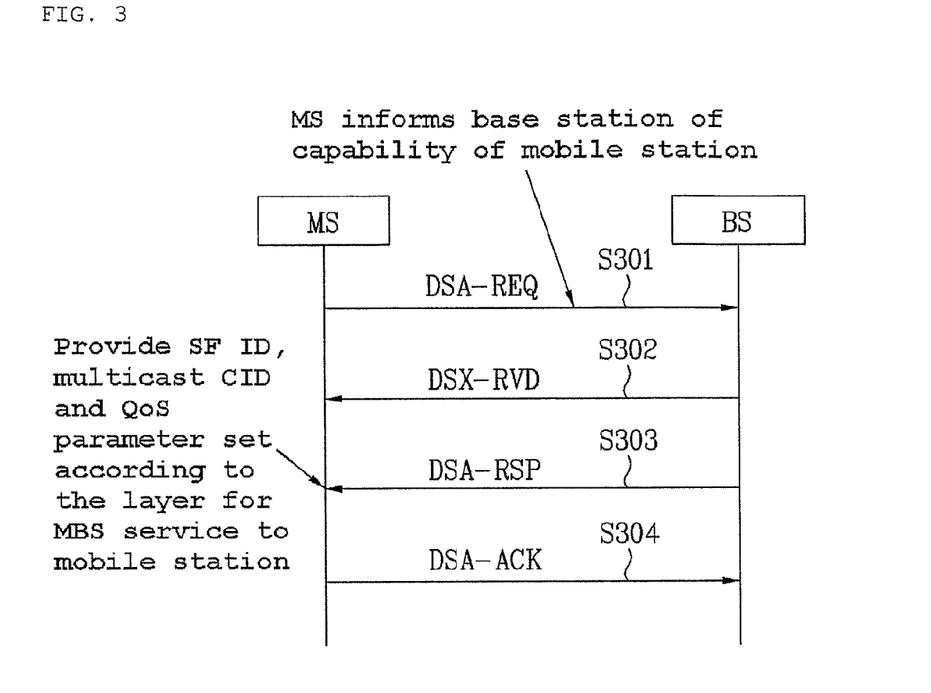
FIG. 3 is a view illustrating a method for negotiating a service parameter for an MBS in a process of exchanging the DSA message between a base station and an MS, in accordance with an embodiment of the present invention.

FIG. 3 is a view illustrating a method for negotiating a service parameter for an MBS in a process of exchanging the DSA message between a base station and an MS according to an embodiment of the present invention.

First, in a step S301, the MS informs the base station of information about the capability and/or the channel status of the MS via a DSA-REQ message. That is, in the present embodiment, the DSA-REQ message may be transmitted in a state of including information indicating the capability and the channel status of the MS in the format shown in Table 1. The base station may inform the MS that the DSA-REQ is being currently processed via a DSX-RVD message in a step S302, similar to the existing method.

Thereafter, the base station which completes the process allocates parameters and multicast CIDs for the MBS to the MS via a DSA-RSP message in a step S303. The allocation information of the parameters and the multicast CIDs may indicate how many layers the multicast service desired by the MS includes, and the service flow IDs, the multicast CIDs and the QoS parameters allocated to the layers.

In more detail, a confirmation code (CC) exists in the DSA-RSP message shown in Table 2. In one embodiment of the present invention, the base station may inform the MSs of whether a plurality of layers are used or not, using the CC. Accordingly, it is preferable that a field indicating whether a plurality of layer is used or not is included in the CC. In the detailed example of the present invention, if the number of CCs is 18, the following CC format may be used so as to indicate that the MBS using the plurality of layers is provided.

TABLE 4

| CC | Status |
| --- | --- |
| 0 | OK/success |
| 1 | Reject-other |
| ... | ... |
| 17 | Reject-not-supported-parameter-value |
| 18 | Multi layer MBS service |

If the CC shown in Table 4 is used and the same MBS is provided using the plurality of layers according to one embodiment of the present invention, the MBS parameters, that is, the service flow IDs and the multicast CIDs may be defined as follows.

First, in a first embodiment of the present invention for the parameters of the MBS using the plurality of layers, a method for defining the service flow IDs according to the layer used for providing the MBS and defining a plurality of CIDs mapped to the plurality of service flow IDs and the respective QoS levels of the plurality of CIDs is suggested. That is, in order to provide the MBS using the plurality of layers as described above, a method for repeating the TVL several times so as to change the service flow IDs according to the layers and mapping the multicast CIDs to the service flow IDs in one-to-one correspondence is suggested.

Next, in a second embodiment of the present invention for the parameters of the MBS using the plurality of layers, a method for defining at least two multicast CIDs mapped to one multicast service flow ID and defining the respective QoS levels of the multicast CIDs is suggested. That is, a method for treating MBS data traffic as one service and allocating multicast CIDs to a lower level of one service flow ID by the number of used layers is suggested.

In the first embodiment, it is preferable that the existing DSA-RSP message is hardly changed and a method for, at the base station, informing the MS that the allocated layers are used for one service is defined, which will be described as follows.

In the TLV of the DSA-RSP used in the broadband wireless access system, the following information necessary for establishing a session between the base station and the MS via the DSA message is included.

TABLE 5

| Type | Parameter |
| --- | --- |
| 1 | Service flow ID |
| 2 | CID |
| 3 | Service class name |
| 4 | Reserved MBS service |
| 5 | QoS parameter set type |
| ... | ... |
| ... | ... |
| 42 | PDU SN expansion subheader for HARQ rearrangement |
| 43 | MBS content ID |
| 44 | HARQ service flow |
| 45 | Authentication token |
| 46 | HARQ channel mapping |

If the information necessary for the session between the base station and the MS is defined in the TLV of the DSA-RSP message, in the first embodiment, since the service flow IDs are allocated according to the layers and the multicast CIDs are allocated according to the service flow IDs, it is preferable that the layer levels of the service flow IDs or the multicast CIDs are mapped between the MS and the base station. Accordingly, in the present embodiment, a method for repeatedly attaching service flow encoding of the TLV form shown in Table 5 by the number of available layers is suggested. At this time, in order to distinguish between the TLVs (service flow encoding) of the number of layers, Table 6 shows an example of a method for allocating the levels of the layers according to the allocated service flow IDs and multicast CIDs.

TABLE 6

| Type | Length | Value | Range |
|---|---|---|---|
| [145/146].4 | 2 | #0: there is no available MBS<br>#1: single BS-MBS (multiple layers are not used)<br>#2: single BS-MBS (base level)<br>#3: single BS-MBS (first enhanced level)<br>#4: single BS-MBS (second enhanced level)<br>#5: single BS-MBS (third enhanced level)<br>...<br>#9: multiple BS-MBS (multiple layers are not used)<br>#10: multiple BS-MBS (base level)<br>#11: multiple BS-MBS (first enhanced level)<br>#12: multiple BS-MBS (second enhanced level)<br>#13: multiple BS-MBS (third enhanced level)<br>... | DSx-REQ<br>DSx-RSP<br>DSx-ACK |

Meanwhile, in the second embodiment, such a method is not necessary because the same service is combined by one service flow ID and thus the MS knows the same service via one service flow ID. In order to allocate several multicast CIDs to one service flow ID, the following CID allocation field is necessary in the DSA message. In more detail, it is preferable that the length is increased for the allocation of the plurality of multicast CIDs in the TLV for allocating the multicast CIDs via the DSA-RSP. Accordingly, in the TLV, the CID allocation field is as follows.

TABLE 7

| Type | Length | Value | Range |
|---|---|---|---|
| [145/146].2 | 10 | CID1, CID2,<br>CID3, CID4, CID5 | DSx-REQ<br>DSx-RSP<br>DSx-ACK |

The DSx in the range of Table 7 includes the DSA, the DSC and the DSD.

In the second embodiment, since the service flow IDs for one MBS is identical regardless of the layer and the multicast CIDs are allocated according to the levels of the layers, the base layer, the first enhanced layer and the second enhanced layer are sequentially mapped according to the allocated CIDs. Even in this case, the MS and the base station can recognize that the services provided via the layers are identical.

The MS which receives the DSA-RSP message transmits a DSA-ACK message and informs the base station that the exchange of the DSA message is completed in a step S304.

The base station which exchanges the DSA messages according to the above-described procedures divides the MBS data into layers, changes the modulation scheme and/or coding rate according to the layers, and transmits the data to the MS. For example, the base station provides the MBS data using QPSK and a 1/2 coding rate in the base layer, provides the MBS data using 16QAM and a 2/3 coding rate in the first enhanced layer, and provides the MBS data using 64QAM and a 3/4 coding rate in the second enhanced layer. Thus, the differential service can be provided according to the layers.

Accordingly, the MS can receive the MBS data by the number of layers which vary according to the capability and/or the channel status of the MS. In more detail, in the reception of the MBS data, the signal of the enhanced layer using the high modulation scheme and/or coding scheme may not be received by the channel status between the MS and the base station.

As a result, according to the present embodiment, the MS can actively and adaptively receive the data according to the capability of the MS and the channel status between the base station and the MS and decide the quality of the service.

In the present embodiment which can provide the differential service according to the MSs, since the necessary service flow IDs and multicast CIDs can be allocated in the step of exchanging the DSA message shown in FIG. 3, it is possible to minimize a portion for increasing system complexity.

Although the MS starts the step of exchanging the DSA message in the embodiment shown in FIG. 3, the base station may transmit the DSA-REQ message so as to start the DSA procedure in another embodiment of the present invention.

Figure 4:
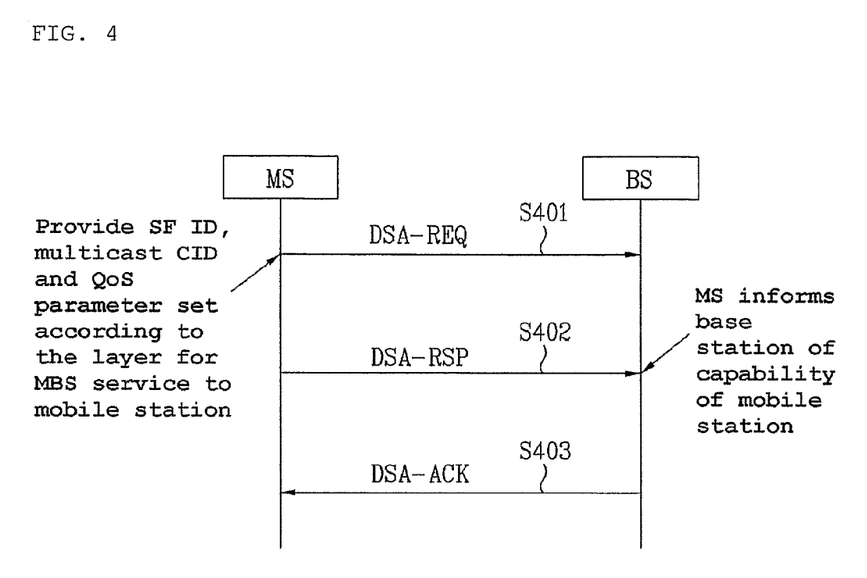
FIG. 4 is a view illustrating a method for negotiating a service parameter for an MBS in a process of exchanging the DSA message between a base station and an MS, in accordance with another embodiment of the present invention.

FIG. 4 is a view illustrating a method for negotiating a service parameter for an MBS in a process of exchanging the DSA message between a base station and an MS according to another embodiment of the present invention.

In more detail, FIG. 4 shows a method for transmitting the DSA-REQ message from the base station in a step S401 and starting the DSA procedure unlike FIG. 3. In the step S401, the base station transmits the DSA-REQ message including the SF IDs, the CIDs and the QoS parameters of the MBS which can be provided to the MSs according to the layers. The mapping relationship between the parameters may be identical to that of the first embodiment or the second embodiment of the present invention for the parameters of the MBS using the plurality of layers.

The MS may inform the base station of acceptance or rejection for the DSA-REQ message as well as the capability information of the MS via the DSA-RSP in a step 402. If the rejection is transmitted, the reason thereof may be also informed.

Thereafter, the base station transmits the DSA-ACK so as to complete the process of exchanging the DSA message in a step S403.

Meanwhile, in a preferred embodiment of the present invention, a step of negotiating basic capability information for the reception of the MBS of the MS and information about all available service layer levels for the provision of the MBS of the base station may be included in a subscriber station basic capability (SBC) negotiating step before establishing the MBS connection via the exchange of the DSA message, which will now be described in detail.

Figure 5:
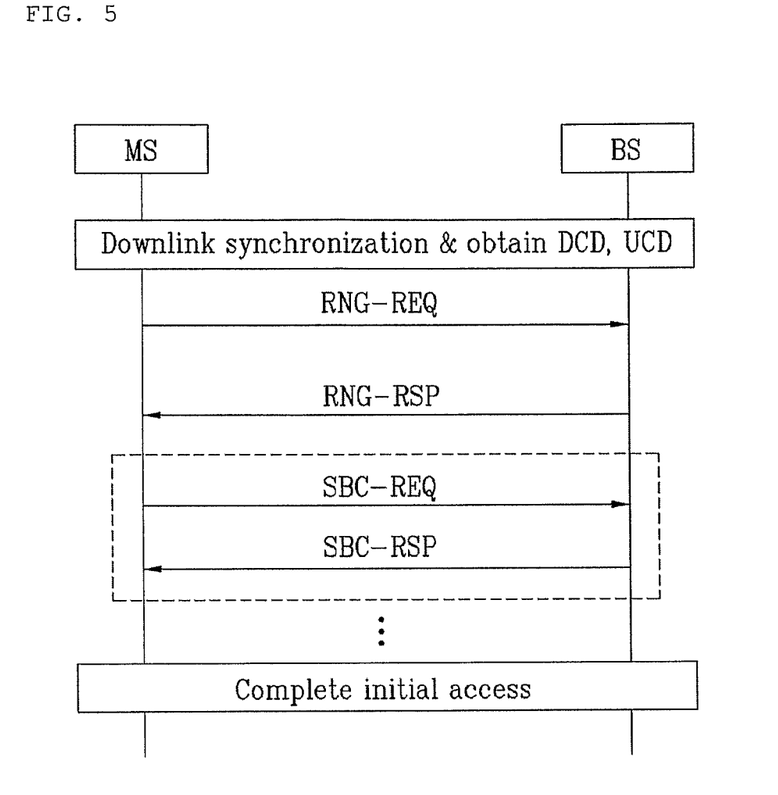
FIG. 5 is a view illustrating a method for negotiating information according to the embodiments of the present invention in a subscriber station basic capability (SBC) step before establishing an MBS connection between the base station and the MS, in accordance with a preferred embodiment of the present invention.

FIG. 5 is a view illustrating a method for negotiating information according to the embodiments of the present invention in the SBC negotiating step before establishing the MBS connection between the base station and the MS according to a preferred embodiment of the present invention.

In an initial access process, negotiation for the basic capability between the base station and the MS is made using SBC-REQ and SBC-RSP messages. FIG. 5 shows a method for negotiating information about the basic capability of the MS for the MBS and information about the level of the layer which can be provided by the base station, according to a preferred embodiment of the present invention.

At this time, the information about the basic capability of the MS may include quality information such as the resolution of the streaming which can be processed by the MS. Table 8 shows an example of the TLV in which the information about the resolution of the MS is included in the SBC-REQ and SBC-RSP messages.

TABLE 8

| Type | Length | Value | Range |
|---|---|---|---|
| 3x | 2 | Bit #0: 200 × 200 16 bits<br>Bit #1: 200 × 200 32 bits<br>Bit #2: 480 × 240 16 bits | SBC-REQ<br>SBC-RSP |

In addition, in the SBC negotiating step, the base station can transmit information about all the available layer levels for providing the MBS using the plurality of layers. Table 9 shows an example of the TLV.

TABLE 9

| Type | Length | Value | Range |
|---|---|---|---|
| 3x | 1 | Bit #0: Based<br>Bit #1: Based + Enhanced 1<br>Bit #2: Based + Enhanced 1 + Enhanced 2 | SBC-REQ<br>SBC-RSP |

Meanwhile, in one embodiment of the present invention, if the layer used for receiving the MBS is changed in a process of adaptively receiving the MBS at the MS, MBS_DATA_IE should be improved as follows in order to prevent the burst position of the layer for providing the MBS from being not detected.

That is, although it is decided that the MS receives the base layer (for example, using the QPSK modulation scheme) and the first enhanced layer (for example, using the 16QAM modulation scheme) in the initial DSA process, when only the base layer is received due to the bad channel status and the enhanced layer is then tried to be received due to the improvement of the channel status, MBS_MAP_IE should be checked in order to detect the position of the burst, because the burst of the enhanced layer was not received for a while. Accordingly, in a preferred embodiment of the present invention, an enhanced layer frame offset is set in MBS_DATA_IE as follows such that the position of the frame including the enhanced layer is specified.

TABLE 10

| Syntax | Size | Notes |
|---|---|---|
| MBS_DATA_IE{ | — | — |
| MBS_MAP Type=0 | 2 bits | MBS_DATA_IE |
| MBS Burst Frame Offset | 2 bits | This represents that the burst positioned by this IE appears after the MBS burst frame offset + two frames. |
| Next MBS MAP change indication | 1 bit | This represents that the size of an MBS MAP message of a next MBS frame for the multicast CID included in this IE is different from that of the MBS MAP message. |
| No. of Multicast CID | 3 bits | — |
| For (i=0; i<No. of Multicast CID, i++){ | — | — |
| Multicast CID | 12 bits | 12 LSBs of the multicast CID |
| } | — | — |
| MBS DIUC | 4 bits | — |
| OFDMA Symbol Offset | 6 bits | OFDMA symbol offset for the start of a next MBS burst frame offset + a second frame. |
| Subchannel offset | 6 bits | OFDMA subchannel offset for the start of a next MBS burst frame offset + a second frame. |
| Boosting | 3 bits | See Table 273 |
| No. OFDMA symbols | 7 bits | Size of MBS data |
| No. Subchannels | 6 bits | — |
| Repetition Coding Indication | 2 bits | 0b00- repeated coding is not used.<br>0b01- repeated coding 2 is used.<br>0b10- repeated coding 4 is used.<br>0b11- repeated coding 6 is used. |
| Next MBS frame offset | 8 bits | A next MBS frame offset value is eight least significant bits of a frame number for transmitting a next MBS frame by the BS. |
| Next MBS OFDMA Symbol offset | 8 bits | Offset of OFDMA symbol in which a next MBS portion starts, which is measured in the unit of an OFDMA symbol from the start of a downlink frame for transmitting MBS_MAP |
| Enhanced layer frame offset | 8 bits | A differential upper level frame offset in which the BS transmits a next MBS frame. |
| If (Next MBS MAP change indication=1)( | — | — |
| Next MBS No. OFDMA symbols | 2 bits | This represents the size of the MBS_MAP message at the next MBS portion in which the BS transmits the next MBS frame to the multicast CIDs in IE. |

Even when the MS does not receive the enhanced layer for a while and then receives the enhanced layer, a differential upper level signal of a next MBS frame can be easily received.

The detailed description of the preferred embodiments of the present invention is provided for allowing those skilled in the art to embody the present invention. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. For example, although the parameters include matters for implementing the present embodiments and other details for easily implementing the present embodiments in the above description, the matters may be implemented by methods other than the above-described methods. Although the MS is used as a subject for receiving the MBS in the above description, other terms such as a subscriber station (SS), a user equipment (UE) or a terminal may be used.

ADVANTAGEOUS EFFECT

In the existing multicast service method, a base station provides a service suitable for an MS having lowest capability and a worst channel status in a multicast group and thus MSs included in the multicast group cannot actively receive the service. In contrast, in one embodiment of the present invention, the MSs adaptively receive an MBS according to the capabilities of MSs and/or the channel statuses between the MSs and the base station, and the base station provides the MBS via a plurality of layers in which a modulation scheme and/or a channel coding rate vary according to the capabilities and/or the channel statuses of the MSs. Accordingly, the service level may vary according to the statuses of the MSs even in the same group.

The invention claimed is:

1. A method for receiving multicast broadcasting service (MBS) data by a mobile station, the method comprising:
    receiving, by the mobile station from a base station, information for receiving MBS data via at least one of a plurality of MBS streams including a base MBS stream and at least one enhanced MBS stream which are broadcast by the base station; and
    selectively receiving, by the mobile station from the base station in a manner of broadcasting, the MBS data with a second quality via the at least one enhanced MBS stream in accordance with a resolution capability and a channel quality of the mobile station while receiving, by the mobile station from the base station in a manner of broadcasting, the MBS data with a first quality via the base MBS stream, wherein the base MBS stream carries the MBS data with the first quality and information on a location of the at least one enhanced MBS stream, wherein the at least one enhanced MBS stream carries the MBS data with the second quality, and wherein the mobile station adaptively transits among the plurality of MBS streams according to a current channel quality of the mobile station while receiving the MBS data, by detecting the at least one enhanced MBS stream using the information on the location of the at least one enhanced MBS stream in the base MBS stream.

2. The method of claim 1, further comprising:
reporting status information about at least one of the resolution capability and the channel quality of the mobile station to the base station,
wherein the received information is determined according to the status information by the base station.

3. The method according to claim 1, wherein the base MBS stream uses a modulation rate less than a predetermined threshold and the at least one enhanced MBS stream uses a modulation rate equal to or greater than the predetermined threshold.

4. The method according to claim 1, wherein the base MBS stream uses a coding rate less than a predetermined threshold and the at least one enhanced MBS stream uses a coding rate equal to or greater than the predetermined threshold.

5. The method according to claim 1, wherein the received information includes at least one of:
a service flow ID representing the MB S data;
at least one multicast connection ID (CID) which is mapped to the service flow ID and corresponds to the at least one of the plurality of MBS steams; and
quality of service (QoS) information of the at least one multicast CID.

6. The method according to claim 1, wherein the received information includes at least one of:
at least one service flow ID corresponding to the at least one of the plurality of MBS streams;
at least one multicast connection ID (CID) which is mapped to the at least one service flow ID; and
quality of service (QoS) information of the at least one multicast CID.

7. The method according to claim 1, wherein the receiving of the information is performed in a connection establishing step for entrance into the MBS streams.

8. The method according to claim 7, further comprising:
before the connection establishing step,
transmitting a request for the MBS data by the mobile station.

9. A mobile station for receiving multicast broadcasting service (MBS) data in a wireless communication system, the mobile station comprising:
a receiver configured to receive radio frequency signals from a base station; and
a processor configured to control the receiver to receive information for receiving MBS data via at least one of a plurality of MBS streams including one base MBS stream and at least one enhanced MBS stream which are broadcast by the base station, and to selectively receive, in a manner of broadcasting, the MBS data with a second quality via the at least one enhanced MBS stream in accordance with a resolution capability and a channel quality of the mobile station while adaptively receiving, in a manner of broadcasting, the MBS data with a first quality via the base MBS stream,
wherein the base MBS stream carries the MBS data with the first quality and information on a location of the at least one enhanced MBS stream,
wherein the at least one enhanced MBS stream carries the MBS data with the second quality, and
wherein the processor adaptively transits among the plurality of MBS streams according to a current channel quality of the mobile station while receiving the MBS data, by detecting the at least one enhanced MBS stream using the information on the location of the at least one enhanced MBS stream in the base MBS stream.

\* \* \* \* \*